2,952,693
Patented Sept. 13, 1960

2,952,693

1-DEHYDRO-11-KETO-PROGESTERONE AND 17-ACYLOXY DERIVATIVES THEREOF

Robert C. Meeks, Kalamazoo, Peter D. Meister, Kalamazoo Township, Kalamazoo County, and Herbert C. Murray, Barry Township, Barry County, Mich., assignors to The Upjohn Company, Kalamazoo, Mich., a corporation of Michigan No Drawing. Filed Nov. 2, 1956, Ser. No. 619,943

3 Claims. (Cl. 260—397.45)

This invention relates to a new chemical compound, 1-dehydro-11-ketotestosterone and to the 17-acyloxy derivatives thereof, which compounds possess valuable anabolic and androgenic activity.

The compounds of this invention have the following structural formula:

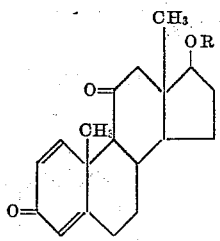

wherein R is a member of the group consisting of hydrogen and the acyl group of a hydrocarbon carboxylic acid of from one to twelve carbon atoms, inclusive.

In addition to its valuable pharmacological properties mentioned above, the free 17-hydroxy compound of this invention is useful as a starting material for the preparation of 1-dehydroadrenosterone, which possesses androgenic and anabolic activity. The free 17-hydroxy group can be oxidized to the 17-keto group through the action of chromic acid. The reaction is conveniently carried out in solution in an organic inert reaction medium, adding at least a molar equivalent of sodium chromate, preferably an excess, and a mineral acid such as sulfuric acid. The product, 1-dehydroadrenostreone, can be recovered from the reaction medium by evaporation to dryness followed by extraction of the residue with methylene chloride followed by recrystallization steps to obtain the desired purity.

The novel free 17-hydroxy compound of the invention can be produced by the fermentative action of *Hypomyces haematococcus* var. *cancri* (*Fusarium solani* var. *striatum*) on allopregnane-3,11,20-trione or by the fermentative 1-dehydrogenation of 11-ketoprogresterone by *Hypomyces haematococcus* or by a fungus of the genus Septomyxa. The fermentations are each carried out under aerobic conditions; the operational conditions and reaction procedure and details of production can be those already known in the art of steroid bioconversion by U.S. Patent 2,602,769, utilizing however, respectively, the action of *Hypomyces haematococcus* var. *cancri* or a species of the fungus of the genus Septomyxa. Among the species of the former useful in the conversion of allopregnane-3,11,20-trione is *Hypomyces haematococcus* var. *cancri*, Wollenweber I, Centraalbureau voor Schimmelcultures, Baarn, Holland. Among the species of the genus Septomyxa which are useful in the conversion of 11-ketoprogesterone are *Septomyxa affinis* (Sherb.) Wr., A.T.C.C. 6737, American Type Culture Collection, 2029 M Street, N.W., Washington 6, D.C. Culture of the organisms for the production of 1-dehydro-11-ketotestosterone is in or on a medium favorable to development of the organism employing conventional sources of assimilable carbon and assimilable nitrogen; and using conventional sources of mineral nutrients.

The 17-acyl deriavtives of 1-dehydro-11-ketotesterone are prepared by acylation methods employed in the art to produce 17-acylates from 17-hydroxy compounds of the androstane series. A suitable method is to dissolve 1-dehydro-11-ketotestosterone in dry pyridine and add an acylating agent to the solution, for example, an anhydride or acid halide of a hydrocarbon carboxylic acid of from one to twelve carbon atoms, inclusive. The 17-acyloxy product is recoverable from the reaction mixture by extraction with an organic solvent such as a mixture of ether and chloroform or ether alone. The 17-acylates may be recovered in purified form by evaporating the extracting solvent and recrystallizing the residue from acetone-hexane mixture, methanol, or similar recrystallization solvents. Of the 17-acyloxy derivatives included in the compounds of this invention, the 17-acetoxy compound is preferred.

The following examples are illustrative of the production of the novel compounds, and are not to be construed as limiting.

EXAMPLE 1

*1-dehydro-11-ketotestosterone from allopregnane-3,11,20-trione*

Twelve liters of a medium containing one percent commercial dextrose hydrate, two percent cornsteep liquor (sixty percent solids), tap water and a small amount of lard oil-octadecanol anti-foamer was adjusted to pH 4.8 by the addition of sodium hydroxide solution. The medium was sterilized for a period of sixty minutes at twenty pounds steam pressure, at the end of which time the pH was 5.0. The sterilized medium was allowed to cool to 28 degrees centigrade and was inoculated with spores of *Hypomyces haematococcus* var. *cancri* (Wollenweber I). Sterile air was admitted through a sparger at the rate of 0.5 liter per minute and the medium agitated with a stirrer at 300 r.p.m. After a growth period of 48 hours at 28 degrees centigrade, 3.0 grams of allopregnane-3,11,20-trione dissolved in 130 milliliters of hot ethanol was added. Fermentation was allowed to continue for an additional period of forty hours. The final pH was 7.5.

At the end of the fermentation the mycelium was separated from the beer and each was extracted thoroughly with methylene chloride. The combined extract was washed with two percent sodium bicarbonate solution and this was followed by a water wash. The methylene chloride extract solution was dried with anhydrous sodium sulfate and evaporated at reduced pressure to yield a dry residue weighing 3.4 grams.

An aliquot of the extract taken before evaporation was analyzed by paper chromatography and was found to contain no unconverted allopregnane-3,11,20-trione.

The residue was dissolved in benzene and separated into its constituents by chromatographic methods. Elution was accomplished with 120-milliliter portions of solvent as shown in Table I.

TABLE I

| Fraction | Volume (mls.) | Solvents | Wt. (mg.) |
|---|---|---|---|
| 0-2 | 360 | Benzene | 240.8 |
| 3-4 | 240 | Benzene—5% Ether | 100.0 |
| 5-6 | 240 | Benzene—10% Ether | 48.7 |
| 7-8 | 240 | Benzene—15% Ether | 26.0 |
| 9-10 | 240 | Benzene—50% Ether | 25.7 |
| 11 | 120 | Ether | 15.6 |
| 12 | 120 | Ether | 15.6 |
| 13 | 120 | Ether—10% Chloroform | 24.0 |
| 14 | 120 | Ether—10% Chloroform | 74.6 |
| 15 | 120 | Ether—20% Chloroform | 139.3 |
| 16 | 120 | Ether—20% Chloroform | 93.4 |
| 17 | 120 | Ether—60% Chloroform | 37.4 |
| 18 | 120 | Ether—60% Chloroform | 7.0 |
| 19 | 120 | Chloroform | 1.8 |
| 20 | 120 | Chloroform | 274.8 |
| 21 | 120 | Chloroform—50% Acetone | 1003.5 |
| 22 | 120 | Chloroform—50% Acetone | 16.0 |
| 23-24 | 240 | Acetone | 20.5 |
| 25 | 120 | Acetone—50% MeOH | 115.4 |
| 26 | 120 | Methanol | 26.5 |

Fraction 21 was dissolved in a mixture of 30:1 methanol-chloroform, filtered, concentrated to two milliliters, and diluted with an equal volume of ether to yield 783 milligrams of crystals having a melting point of 232 to 235 degrees centigrade. Recrystallization from methanol, followed by recrystallization from ethyl acetate, yielded pure 1-dehydro-11-ketotestosterone, M.P. 233.5 to 234.5 degrees centigrade. It had the following physical properties: $[\alpha]_D^{23} + 169$ degrees $$\lambda_{max}^{alc.} 239 \ m\mu$$

$\epsilon$ 14,600. Infrared spectrum indicates absorption as follows: OH, 3430 cm.$^{-1}$; nonconjugated ketone, 1695 cm.$^{-1}$; $\Delta^{1,4}$-3-ketone, 1616, 1603 cm.$^{-1}$ in nujol and 1617, 1602 cm.$^{-1}$ in chloroform; and a conjugated ketone, 1657 cm.$^{-1}$

*Analysis.*—Calculated for $C_{19}H_{24}O_3$: C, 76.03; H, 7.95. Found: C, 75.97; H, 8.05.

EXAMPLE 2

*1-dehydro-11-ketotestosterone from 11-ketoprogesterone*

Substantially the same fermentation conditions were followed but employing *Septomyxa affinis*, A.T.C.C. 6737 as the organism and 11-ketoprogesterone as the substrate, yielding 1-dehydro-11-ketotestosterone as one of the products separable by chromatographic methods which possessed physical properties agreeing with the product of Example 1, above.

EXAMPLE 3

*1-dehydro-11-ketotestosterone 17-acetate*

A reaction mixture was made by dissolving 83.5 milligrams of 1-dehydro-11-ketotestosterone in 1.0 milliliter of dry pyridine and 0.5 milliliter of acetic anhydride. The solution was kept at about twenty to 25 degrees centigrade overnight, whereupon it was diluted with ice water and extracted with ether. The ether extract was washed with five percent sodium bicarbonate solution; then it was washed with water, and both washing operations were repeated in respective sequence. The ether phase of the washed mixture was dried with anhydrous sodium sulfate and concentrated to give 82.5 milligrams of a crystalline residue of crude 1-dehydro-11-ketotestosterone 17-acetate. The residue was recrystallized from acetone-Skellysolve B hexanes to yield 71 milligrams of crystals having a melting point of 234 to 237 degrees centigrade. Recrystallization from acetone yielded pure crystals of 1-dehydro-11-ketotestosterone 17-acetate, M.P. 230 to 232 degrees centigrade. It had the following characteristics: $[\alpha]_D^{23} + 135$ degrees in chloroform (0.91 conc.). Infrared spectrum analysis confirmed the structure.

*Analysis.*—Calculated for $C_{21}H_{28}O_4$: C, 73.66; H, 7.66. Found: C, 73.83; H, 7.64.

Substituting propionic anhydride, benzoyl chloride, decanoyl chloride, octanoyl chloride, valeryl bromide, succinic anhydride and cyclopentylpropionic anhydride for the acetic anhydride in the above procedure is productive of the corresponding 17-esters of 1-dehydro-11-ketotestosterone, namely, the 17-propionate, the 17-benzoate, the 17-decanoate, the 17-octanoate, the 17-valerate, the 17-succinate, and the 17-cyclopentylpropionate.

1-dehydro-11-ketotestosterone and the 17-acyloxy derivatives thereof of this invention exhibit valuable anabolic and androgenic activity and can be administered in the form of tablets, capsules, syrups and the like for oral use or in suitable conventional suspension media for injection use.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound of the structural formula:

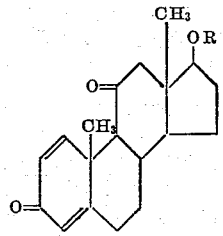

wherein R is a member of the group consisting of hydrogen and the acyl group of a hydrocarbon carboxylic acid of from one to twelve carbon atoms, inclusive.

2. 1-dehydro-11-ketotestosterone.

3. 1-dehydro-11-ketotestosterone 17-acetate.

References Cited in the file of this patent

UNITED STATES PATENTS

| | | |
|---|---|---|
| 2,756,179 | Fried | July 24, 1956 |
| 2,781,368 | Heyl | Feb. 12, 1957 |
| 2,837,464 | Nobile | June 3, 1958 |
| 2,902,410 | Weintraub et al. | Sept. 1, 1959 |
| 2,902,498 | Fried et al. | Sept. 1, 1959 |

OTHER REFERENCES

H. J. Ringold et al.: J. Org. Chem., vol. 21, pages 239–240, February 1956.